United States Patent
Lindoff et al.

(10) Patent No.: US 10,834,676 B2
(45) Date of Patent: Nov. 10, 2020

(54) WIRELESS DEVICE AND A METHOD THEREIN FOR PERFORMING ONE OR MORE OPERATIONS BASED ON AVAILABLE ENERGY

(71) Applicant: Telefonaktiebolaget LM Ericsson (publ), Stockholm (SE)

(72) Inventors: Bengt Lindoff, Bjarred (SE); Lars Andersson, Solna (SE); Magnus Astrom, Lund (SE); Fredrik Nordstrom, Lund (SE); Andres Reial, Malmo (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 16/337,249

(22) PCT Filed: Sep. 29, 2016

(86) PCT No.: PCT/EP2016/073273
§ 371 (c)(1),
(2) Date: Mar. 27, 2019

(87) PCT Pub. No.: WO2018/059692
PCT Pub. Date: Apr. 5, 2018

(65) Prior Publication Data
US 2019/0230594 A1    Jul. 25, 2019

(51) Int. Cl.
*H04W 52/02* (2009.01)
*H04L 1/02* (2006.01)
(Continued)

(52) U.S. Cl.
CPC .......... *H04W 52/0277* (2013.01); *H04B 7/02* (2013.01); *H04B 7/022* (2013.01);
(Continued)

(58) Field of Classification Search
CPC ............... H04W 52/0258; H04W 4/38; H04W 52/0264; H04W 52/0277; H04W 48/02;
(Continued)

(56) References Cited

U.S. PATENT DOCUMENTS

| 8,655,307 B1 | 2/2014 | Walker et al. |
| 2009/0098914 A1* | 4/2009 | Martin-Cocher ........... H04W 52/0261 455/572 |

(Continued)

FOREIGN PATENT DOCUMENTS

| EP | 2595448 A1 | 5/2013 |
| WO | 2016099365 A1 | 6/2016 |

OTHER PUBLICATIONS

PCT International Search Report, dated May 26, 2017, in connection with International Application No. PCT/EP2016/073273, all pages.
(Continued)

*Primary Examiner* — Fred A Casca
(74) *Attorney, Agent, or Firm* — Leffler Intellectual Property Law, PLLC (57) ABSTRACT

A wireless device and a method therein for performing one or more operations based on available energy. The wireless device is configured to operate in a wireless communications network. Based on an amount of energy available for operation and based on control information, the wireless device determines an allocation of the amount of available energy between at least a first energy part and a second energy part. The first energy part is to be used in a sensing operation using a sensing operation configuration and the second energy part is to be used in a communicating operation using a communicating operation configuration. The wireless device performs based on the determined allocation, one or more operations out of: the sensing
(Continued)

Method performed by the wireless device 102 operation using the first energy part and the sensing operation configuration, and the communicating operation using the second energy part and the communicating operation configuration.

25 Claims, 3 Drawing Sheets

(51) Int. Cl.

| | | |
|---|---|---|
| H04L 1/04 | (2006.01) | |
| H04B 7/022 | (2017.01) | |
| H04B 7/02 | (2018.01) | |
| H04B 7/0408 | (2017.01) | |
| H04B 7/04 | (2017.01) | |
| H04B 7/0404 | (2017.01) | |
| H04B 7/0491 | (2017.01) | |
| H04B 7/06 | (2006.01) | |
| H04M 1/73 | (2006.01) | |
| H04L 1/06 | (2006.01) | |

(52) U.S. Cl.
CPC ............... *H04B 7/028* (2013.01); *H04B 7/04* (2013.01); *H04B 7/0404* (2013.01); *H04B 7/0408* (2013.01); *H04B 7/0491* (2013.01); *H04B 7/06* (2013.01); *H04B 7/0602* (2013.01); *H04B 7/0615* (2013.01); *H04B 7/0617* (2013.01); *H04B 7/0619* (2013.01); *H04L 1/02* (2013.01); *H04L 1/04* (2013.01); *H04M 1/73* (2013.01); *H04W 52/028* (2013.01); *H04B 7/0613* (2013.01); *H04L 1/06* (2013.01); *H04L 1/0668* (2013.01); *H04L 1/0681* (2013.01); *H04L 1/0693* (2013.01); *Y02D 30/70* (2020.08)

(58) Field of Classification Search
CPC ... H04W 52/146; H04B 7/043; H04B 7/0617; G06F 1/3203; G06F 1/329; G06F 1/3234; G06F 1/3275; G06F 2217/78; Y02D 10/174; Y02D 10/171; Y02D 10/172; Y02D 70/00; G09G 2330/021; G09G 2330/023

See application file for complete search history.

(56) References Cited

U.S. PATENT DOCUMENTS

| | | | |
|---|---|---|---|
| 2013/0336185 A1* | 12/2013 | Yang | H04W 52/028 370/311 |
| 2015/0257643 A1 | 9/2015 | Watson et al. | |
| 2015/0303975 A1 | 10/2015 | Calhoun et al. | |
| 2015/0341842 A1 | 11/2015 | Vorenkamp | |
| 2017/0134884 A1* | 5/2017 | Taborn | H04W 4/70 |

OTHER PUBLICATIONS

PCT Written Opinion, dated May 26, 2017, in connection with International Application No. PCT/EP2016/073273, all pages.
B. Thenral et al., "Proficient Routing Method That Exploits the Lifetime of Wireless Sensor Networks", 2013 International Conference on Current Trends in Engineering and Technology, ICCTET, Jul. 3, 2013 IEEE, pp. 231-234.

* cited by examiner

Figure 1

Figure 2 Method performed by the wireless device 102

Figure 3

WIRELESS DEVICE AND A METHOD THEREIN FOR PERFORMING ONE OR MORE OPERATIONS BASED ON AVAILABLE ENERGY

TECHNICAL FIELD

Embodiments herein relate generally to a wireless device and a method therein. In particular, embodiments relate to the performing of one or more operations based on available energy.

BACKGROUND

Communication devices such as terminals are also known as e.g. User Equipments (UEs), mobile terminals, stations (STAs), wireless devices, wireless terminals and/or mobile stations. Terminals are enabled to communicate wirelessly in a wireless communications network, such as a Wireless Local Area Network (WLAN), or a cellular communications network sometimes also referred to as a cellular radio system or cellular networks. The communication may be performed e.g. between two terminals, between a terminal and a regular telephone and/or between a terminal and a server via an access network and possibly one or more core networks, comprised within the wireless communications network.

The above communications devices may further be referred to as mobile telephones, cellular telephones, laptops, tablets or sensors with wireless capability, just to mention some further examples. The communications devices in the present context may be, for example, portable, pocket-storable, hand-held, wall-mounted, computer-comprised, or vehicle-mounted mobile devices, enabled to communicate voice and/or data, via the access network, such as a Radio Access Network (RAN), with another entity, such as an Access Point (AP), another communications device or a server.

The communications network covers an area, e.g. a geographical area, which is divided into subareas, such as coverage areas, cells or clusters. In a cellular communications network each cell area is served by an access node such as a base station, e.g. a Radio Base Station (RBS), which sometimes may be referred to as e.g. eNodeB (eNB), NodeB, B node, or Base Transceiver Station (BTS), depending on the technology and terminology used. The base stations may be of different classes such as e.g. macro eNodeB, home eNodeB, micro eNode B or pico base station, based on transmission power, functional capabilities and thereby also cell size. A cell is the area where radio coverage is provided by the base station at a base station site. One base station, situated on the base station site, may serve one or several cells. Further, each base station may support one or several communication technologies. The base stations communicate over the air interface operating on radio frequencies with the communications devices within range of the base stations. In the context of this disclosure, the expression Downlink (DL) is used for the transmission path from the base station to the communications device. The expression Uplink (UL) is used for the transmission path in the opposite direction i.e. from the communications device to the base station.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipment. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a Radio Network Controller (RNC) or a Base Station Controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO systems.

In a couple of years, 50 billion devices are expected to be connected through wireless communications networks, hence enabling the 4th industrial revolution or the Internet of Things (IoT) era. The majority of such connected devices, sometimes referred to as IoT devices, are expected to be sensors that measure and collect data and transmit the results to another location, using wireless connections. The sensing systems may be connected using traditional wireless communications networks or short range connections. The sensors and data collection may be integrated using cloud technologies. Some examples of such sensing systems may be groups of temperatures or humidity sensors, remote camera surveillance and movement detection, etc.

Energy consumption is one parameter that is vital for the enablement and success of IoT. Ten years' longevity is a typical timeframe adopted by the industry. In some industries the "buried-and-forget" scenario is preferred and in such a case a lifetime of thirty ears is expected. This requires great resource frugality both in the communications modules as in the sensor or actuator modules of the device. Hence a great deal of work is put into defining communications protocols allowing operation with extended transmission/reception intervals, poor synchronization, low signal amplitudes etc. In general, sensor transceiver design often targets operation at low link quality and at a low expended energy cost.

To extend the life of the devices, e.g. the sensor units, when changing the battery is not feasible, e.g. due to physical access limitations or the sheer number of units, certain types of sensor units may be powered by energy harvesting units. Some examples of energy harvesting units may be based on extracting energy from vibration, other mechanical movement, solar radiation, RF signals in the environment, thermocouples, etc.

Depending on the type of harvesting approach, energy may not be provided to the sensor unit continuously. Instead, energy is replenished or boosted when e.g. movement occurs or sunlight is available. Some sensor units operate only while the energy source is active. Other units incorporate small rechargeable batteries to store the generated energy and use it between the energy boosts.

The document "Proficient Routing Method That Exploits The Lifetime Of Wireless Sensor Networks" to B. Thenral (XP032528198, International Conference on Current Trends in Engineering and Technology, ICCTET'13, IEEE 2013, Jul. 3, 2013, Coimbatore, India) discloses how to divide node energy into two ratios, wherein a first ratio is used for transmission of sensor node generated data and the second ratio is used for transmission (relaying) of data from other sensors.

A drawback with the prior art systems is that they do not provide an optimised way of utilising available energy.

SUMMARY

An object of embodiments herein is to address at least some of the above-mentioned drawbacks among others and to improve the performance in a wireless communications network.

According to one aspect of embodiments herein, the object is achieved by a method performed by a wireless device for performing one or more operations based on available energy. The wireless device operates in a wireless communications network.

The wireless device determines, based on an amount of energy available for operation and based on control information, an allocation of the amount of available energy between at least a first energy part and a second energy part. The first energy part of the amount of available energy is to be used in a sensing operation using a sensing operation configuration and the second energy part of the amount of available energy is to be used in a communicating operation using a communicating operation configuration.

The wireless device performs, based on the determined allocation, one or more operations out of: the sensing operation using the first energy part and the sensing operation configuration, and the communicating operation using the second energy part and the communicating operation configuration.

According to another aspect of embodiments herein, the object is achieved by a wireless device for performing one or more operations based on available energy. The wireless device is configured to operate in a wireless communications network.

The wireless device is configured to determine, based on an amount of energy available for operation and based on control information, an allocation of the amount of available energy between at least a first energy part and a second energy part. The first energy part of the amount of available energy is to be used in a sensing operation using a sensing operation configuration and the second energy part of the amount of available energy is to be used in a communicating operation using a communicating operation configuration.

Further, the wireless device is configured to perform, based on the determined allocation, one or more operations out of: the sensing operation using the first energy part and the sensing operation configuration, and the communicating operation using the second energy part and the communicating operation configuration.

According to another aspect of embodiments herein, the object is achieved by a computer program, comprising instructions which, when executed on at least one processor, causes the at least one processor to carry out the method performed by the wireless device.

According to another aspect of embodiments herein, the object is achieved by a carrier comprising the computer program, wherein the carrier is one of an electronic signal, an optical signal, a radio signal or a computer readable storage medium.

Since the wireless device determines, based on the amount of energy available for operation and based on control information, the allocation of the amount of available energy between at least the first energy part and the second energy part, and since the wireless device performs, based on the determined allocation, the one or more operations out of: the sensing operation using the first energy part and the sensing operation configuration, and the communicating operation using the second energy part and the communicating operation configuration, the utilisation of the available energy is improved. This results in an improved performance in the wireless communications network.

An advantage with embodiments herein is that they provide an improved use of available energy for sensing and/or communicating operations.

A further advantage with embodiments herein is that they provide for optimization of allocation of available energy to different tasks, e.g. to sensing and/or communicating operations.

BRIEF DESCRIPTION OF DRAWINGS

Examples of embodiments herein are described in more detail with reference to attached drawings in which.

DETAILED DESCRIPTION

As part of developing embodiments herein, some problems with the state of the art communications networks will first be identified and discussed.

Wireless devices, such as IoT devices, may have a variable amount of energy to use for sensing and/or communicating operations. Hence, such wireless devices may not be able to schedule deterministic reporting of fixed, predetermined amounts of data at regular intervals. Instead the approach may be to sense and transmit on a best effort basis given the available amount of energy. However, it is unclear in the prior art how to use available energy in a good way in terms of splitting the available energy between different operations such as sensing and communicating operations.

Hence there is a need to optimise the use of available energy in a wireless device in terms of energy split between different operations, such as sensing and/or communicating operations, in order to improve the performance in a wireless communications network.

A problem addressed by embodiments herein is therefore how to improve performance in a wireless communications network.

Therefore, as mentioned above, according to embodiments herein, a way of improving the performance in the wireless communications network is provided.

Some embodiments disclosed herein provides a method performed by a wireless device, such as an IoT device. The wireless device may comprise at least one sensor and at least one communication unit, e.g. a Wireless Radio communication Unit (WRU). The wireless device determines an amount of energy that is available for performing one or more operations, e.g. a sensing operation and a communicating operation. Based on the amount of available energy, the wireless device may determine the energy split between the sensing and communicating operations, the possible operation configurations in terms of e.g. time for sensor measurements, amount of sensor values to measure etc. for the sensing operation, as well as the feasible amount of sensor information to transmit as well as accuracy of the transmitted sensor information when performing the communicating operation. In some embodiments, the wireless device may determine to only perform the sensing operation and store sensed data for later transmission, or only perform the communicating operation, e.g. to only do transmission of previously stored sensing data. After determining the appropriate operation configurations, the wireless device performs the sensing operation and/or communicating operation according to the respective operation configuration.

Note that although terminology from WLAN is used in this disclosure to exemplify the embodiments herein, this should not be seen as limiting the scope of the embodiments herein to only the aforementioned system. Other wireless systems, such as for example an LR-WPAN, a Bluetooth network, a 5G network, an LTE network, a Wideband Code Division Multiple Access (WCDMA) network, a Global System for Mobile Communications (GSM) network, any 3GPP cellular network, Worldwide Interoperability for Microwave Access (WiMAX) network, a SIGFOX network, a Zigbee network, a Bluetooth Low Energy (BLE) network such as a Bluetooth Smart network, or a Narrow Band Internet of Things (NB-IoT) network, may also benefit from exploiting the ideas covered within this disclosure.

In this section, the embodiments herein will be illustrated in more detail by a number of exemplary embodiments. It should be noted that these embodiments are not mutually exclusive. Components from one embodiment may be assumed to be present in another embodiment and it will be obvious to a person skilled in the art how those components may be used in the other exemplary embodiments.

Figure 1:
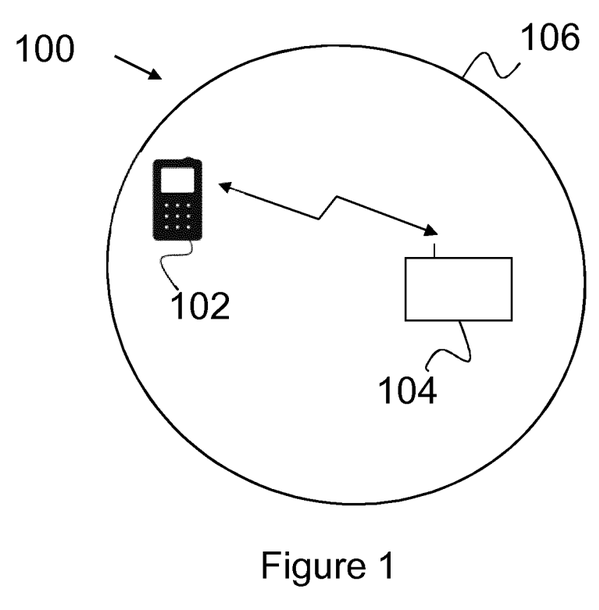
FIG. 1 is a schematic block diagram illustrating embodiments of a wireless communications network.

FIG. 1 depicts an example of a wireless communications network 100 in which embodiments herein may be implemented. The wireless communications network 100 may be a short range communications network, such as a WLAN, a Low Rate Wireless Personal Access Network (LR-WPAN) as defined in e.g. IEEE 802.15.4 or a Bluetooth network, or a cellular communications network such as a 5G network, an LTE network, a Wideband Code Division Multiple Access (WCDMA) network, a Global System for Mobile Communications (GSM) network, any 3GPP cellular network, Worldwide Interoperability for Microwave Access (WiMAX) network, a SIGFOX network, a Zigbee network, a Bluetooth Low Energy (BLE) network such as a Bluetooth Smart network, or a Narrow Band Internet of Things (NB-IoT) network or a combination of one or more of the aforementioned communications networks just to mention some examples.

A wireless device 102 operates in the wireless communications network 100. Thus, the wireless device 102 is configured to operate in the wireless communications network 100. Further, the wireless device 102 may be comprised in the wireless communications network 100. The wireless device 102 may be a wireless communications device such as an Internet of Thing (IoT) device, a Long Range Low Power (LRLP) device, a User Equipment (UE), or another node capable of transmitting data to a receiving node. The wireless device 102 may sometimes be referred to as a sensor. However, it should be understood that the wireless device 102 may comprise one or more sensor units configured to perform one or more sensing operations.

In some of the embodiments described herein the non-limiting term UE is used and it refers to any type of device communicating with a network node 104 in a wireless communications network, e.g. the communications network 100. Examples of wireless devices or UEs are stations (STAs), target devices, device to device UEs, machine type UEs or UEs capable of machine to machine communication, Personal Digital Assistants (PDA), iPADs, Tablets, mobile terminals, smart phones, Laptop Embedded Equipped (LEE), Laptop Mounted Equipment (LME), USB dongles etc.

In this disclosure the terms wireless device and UE are used interchangeably. Further, it should be noted that the term user equipment used in this disclosure also covers other wireless communications devices such as Machine Type of Communication (MTC) device, an Internet of Things (IoT) device, e.g. a Cellular IoT (CIoT) device. Please note the term user equipment used in this document also covers other wireless communications devices such as Machine to Machine (M2M) devices, even though they do not have any user.

A network node 104 operates in the wireless communications network 100. Thus, the network node 104 is configured to operate in the wireless communications network 100. The network node 104 may be comprised in the wireless communications network 100.

The network node 104 may be an Access Node (AN), e.g. a wireless access node, such as a WLAN access node, an LRWPAN access node, a radio access node or any node capable of transmitting data to a receiving node. The AN may be referred to as an Access Point (AP), and the terms AN and AP may be used interchangeably.

The radio access node may be a radio base station, for example an eNB, i.e. an eNodeB, or a Home Node B, an Home eNode B or any other network node 104 capable to serve and/or communicate with a wireless device in the communications network 100.

In embodiments comprising device-to-device (D2D) communication, the network node 104 may be a second wireless device. In such embodiments, the wireless device 102 may be referred to as a first wireless device 102.

Further, the wireless device 102 and the network node 104 are configured for wireless communication with each other when being located within radio coverage with each other, e.g. within a coverage area 106 served by one of the nodes, e.g. the network node 104, having radio coverage within the coverage area 106. Herein, this is also specified as the network node 104 manages or is configured to manage communication with the wireless device 102 in the coverage area 106. The coverage area 106 may be determined as the area where communication between the nodes are possible, given one or more constraints on, e.g., output power, required data rate and similar. In this disclosure, the coverage area 106 is sometimes also referred to as a cell or a cluster. Further, one or more nodes may be said to belong to the same Basic Serving Set (BSS) when they are operating within the coverage area 106.

An example of how the wireless device 102 may operate for performing one or more operations based on available energy, will now be described with reference to the combined flowchart depicted in FIG. 2. As previously mentioned, the wireless device 102 operates in the wireless communications network 100.

Figure 2:
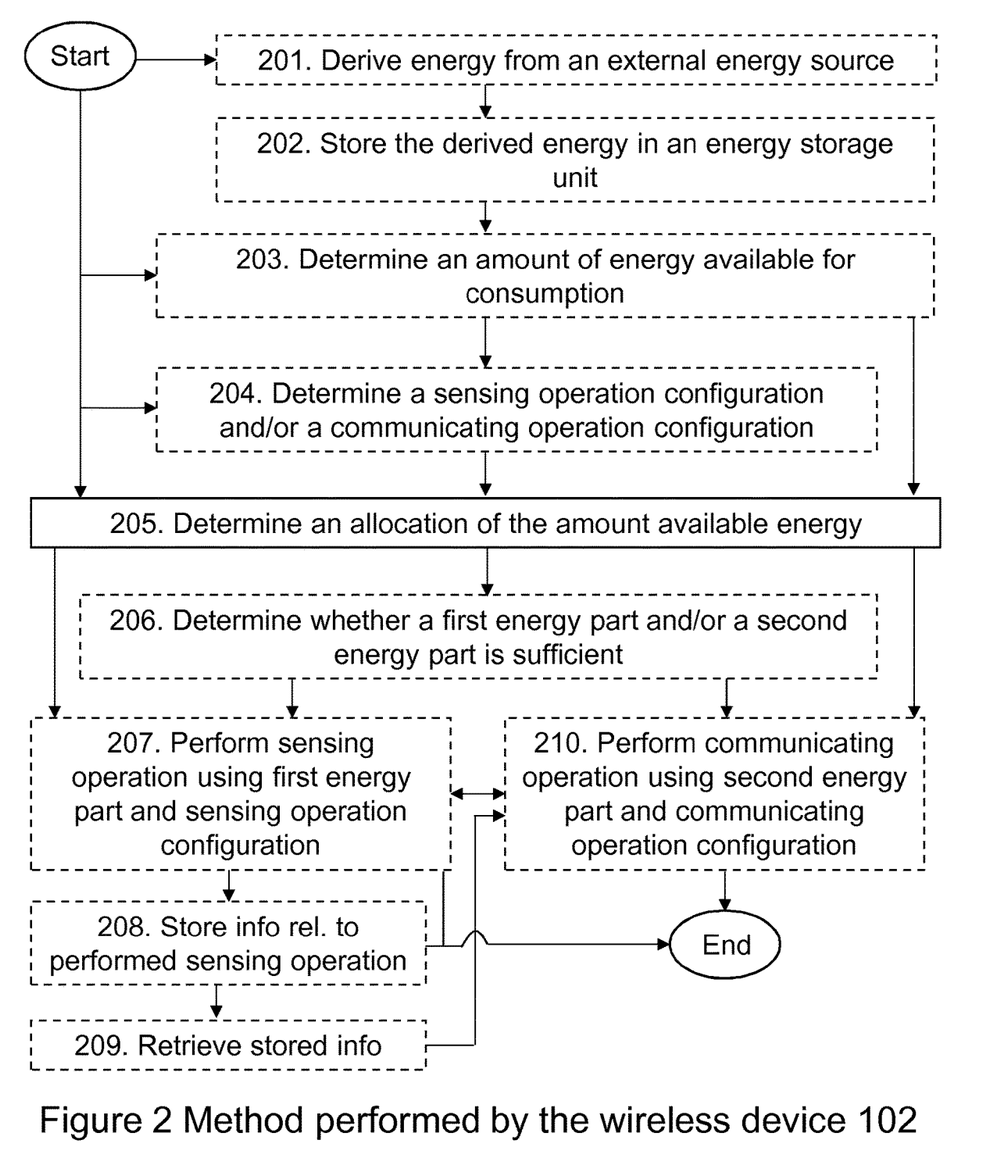
FIG. 2 is a flowchart schematically illustrating embodiments of a method performed by a wireless device.

The procedure depicted in FIG. 2 comprises one or more of the following actions. It should be understood that these actions may be taken in any suitable order and that two or more of the actions may be combined. Further, some actions may be optional. In FIG. 2, examples of actions that may be optional are illustrated using dashed lines.

Performance of one or more actions described herein may be triggered in several ways. For example, a network node, e.g. the network node 104, may trigger the wireless device 102 to perform one or more operations at one or more points in time, e.g. at predefined points in time. As another example, the wireless device 102 may be triggered to perform one or more operations when the amount of available energy is above an energy threshold value, e.g. above a predefined energy threshold value. As a further example, the wireless device 102 may be triggered to perform one or more operations when there is a need to perform the one or more operations.

Action 201

In some embodiments and in order to ensure that the wireless device 102 has enough energy for performing one or more operations, the wireless device 102 derives energy from an external source. For example, the energy may be one or more of: solar energy, thermal energy, wind energy, energy from salinity gradients, kinetic energy, and energy from an external battery just to mention some examples. Some other examples of the energy are pressure energy and potential energy.

This may also be referred to as energy harvesting.

Action 202

In some embodiments, the wireless device 102 stores the derived energy in an energy storage unit 306a. Thereby, stored energy may be used for performing one or more operations at a later point in time.

Action 203

In some embodiments, the wireless device 102 determines the amount of energy available for operation based on an amount of energy stored in an energy storage unit 306a and possibly further based on a predicted amount of energy available for operation at a future point of time. The amount of energy stored in the energy unit 306 may comprise the derived energy or parts thereof. The predicted amount of energy available for operation at the future point of time may be the predicted amount after performing one or more operations scheduled to be performed before the future point of time but not yet performed and after predicted and scheduled energy harvesting. Thus, when one or more operations are to be performed at a future point of time, already scheduled operations and allocated energy parts have to be taken into consideration when determining the amount of energy available for the one or more operations to be performed.

Action 204

In some embodiments, the wireless device 102 determines the sensing operation configuration available for the sensing operation and the communicating operation configuration available for the communicating operation based on the amount of available energy for operation and based on the control information.

In some embodiments, the control information comprises information relating to one or more out of: a pre-configuration of the wireless device 102, historic data of one or more previously performed sensing and/or communicating operations, a first predefined energy consumption per sensing operation for performing the sensing operation using one or more sensors, a second energy consumption per communicating operation for performing the communicating operation, a priority relation between the sensing operation and the communicating operation.

The sensing configuration may comprise one or more of: an amount of time for the sensing operation; information relating to one or more sensors to be enabled when performing the sensing operation, and information relating to the accuracy of resolution and sampling frequency of the sensing operation. Thus, based on the amount of available energy the wireless device 102 may determine the amount of time for the sensing operation that is possible, the number of sensors that may be enabled for performing the sensing operation, and/or the accuracy in terms of resolution and sampling frequency of the sensing operation.

Further, the sensing configuration may comprise information relating to a prioritisation of sensors to be used in a sensing operation.

Since the sensing operation may comprise several sensing operation parts, e.g. a temperature sensing part and a humidity sensing part, the sensing configuration may relate to the amount of time for performing the respective sensing part, to which one or more sensors to be enabled for performing the respective sensing part, to information relating to the accuracy, resolution and sampling frequency of the respective sensing part, and to a prioritisation between sensors, e.g. between a temperature sensor and a humidity sensor, may exist.

Further, the communicating configuration may comprise one or more of: information relating to a prioritisation of data to be communicated, a time duration for the communicating operation, a resolution of data to be communicated, an available point of time for performing a signal strength measurement, and a bandwidth for performing the signal strength measurement. Thus, based on the amount of available energy the wireless device 102 may determine a prioritization of data to be transmitted, e.g. to transmit most significant data or most recent data first, a time duration for transmission, a resolution of the transmitted data, an available time for doing signal strength measurements for a handover operation, a cell selection operation and/or an access point selection operation, and/or a bandwidth to do the signal strength measurements.

Action 205

The wireless device 102 determines an allocation of the amount of available energy between at least a first energy part and a second energy part based on an amount of energy available for operation and based on control information. The first energy part of the amount of available energy is to be used in a sensing operation using a sensing operation configuration and the second energy part of the amount of available energy is to be used in a communicating operation using a communicating operation configuration.

The wireless device 102 may allocate the first energy part to be zero in case only one or more communicating operations are to be performed, and the wireless device 102 may allocate the second energy part to zero in case only one or more sensing operations are to be performed.

In some embodiments and as mentioned above, the control information comprises information relating to one or more out of: a pre-configuration of the wireless device 102, historic data of one or more previously performed sensing and/or communicating operations, a first predefined energy consumption per sensing operation for performing the sensing operation using one or more sensors, a second energy consumption per communicating operation for performing the communicating operation, a priority relation between the sensing operation and the communicating operation. Thus, the amount of energy available, may be allocated in dependence of a pre-configuration of the wireless device 102. The pre-configuration may be determined by a network node, such as the network node 104 or a remote server (not shown), and may relate to the number of sensors to be used for a sensing operation, the setting of the sensors for performing the sensing operation, and the settings for performing a communicating operation. Some other examples are periods of operation, e.g. daytime operation or nighttime operation, prioritization of different periods of operation, and prioritizations of different operations. For example, one communicating operation per day may be very important whereas all other communicating operations are good to have, but the sensing operation should be prioritized.

Further, the control information may comprise a priority relation between several sensing operation parts of the sensing operation and/or between several communicating operation parts of the communicating operation. Since a sensing operation may comprise several parts such as a temperature sensing part and a humidity sensing part, the two parts may be assigned different priorities and in case the available energy is not enough for performing both the temperature sensing part and the humidity sensing part, only the sensing part having the highest priority is performed. Similarly, if the communicating operation comprises a communicating temperature part and a communicating humidity part having different priorities only the communicating part having the highest priority is performed if the available energy for communicating is not enough for performing both communicating operation parts.

Action 206

In some embodiments, the wireless device 102 determines whether or not the first energy part is sufficient for performing the sensing operation using the first energy part and the sensing operation configuration.

For example, the first energy part may be insufficient when the communicating operation is a prioritised operation, e.g. when the communicating operation has a higher priority than the sensing operation, and thus the second energy part is allocated all energy needed for performing the communicating operation. In that case, the wireless device 102 determines whether or not the first energy part allocated for the sensing operation is sufficient for performing the sensing operation using the sensing operation configuration.

Alternatively or additionally, in some embodiments, the wireless device 102 determines whether or not the second energy part is sufficient for performing the communicating operation using the second energy part and the communicating operation configuration.

For example, the second energy part may be insufficient when the sensing operation is a prioritised operation, e.g. when the sensing operation has a higher priority than the communicating operation, and thus the first energy part is allocated all energy needed for performing the sensing operation. In that case, the wireless device 102 determines whether or not the second energy part allocated for the communicating operation is sufficient for performing the communicating operation using the communicating operation configuration.

Action 207

The wireless device 102 performs based on the determined allocation, one or more operations. Thereby, an improved use of available energy for performing the one or more operations is provided. The wireless device 102 may perform the sensing operation using the first energy part and the sensing operation configuration.

Action 210 below will describe in more detail how the wireless device 102 may perform the communicating operation. As will be described, the communicating operation may be performed as an alternative to the sensing operation or in addition to the sensing operation.

In some embodiments, the sensing operation comprises a plurality of sensor operation parts. This may be the case when the sensing operation comprises a plurality sensing operation parts to be performed simultaneously or sequentially. For example, the sensing operation may comprise a temperature sensing operation part and a humidity sensing operation part. In such embodiments, the wireless device 102 may perform the sensing operation using the first energy part and the sensing operation configuration by performing each sensor operation part out of the plurality of sensor operation parts using a fraction of the first energy part and the sensing operation configuration. For example, the wireless device 102 may perform the temperature sensing operation part using a first fraction of the first energy part and the sensing operation configuration, and the humidity sensing operation part using a second fraction of the first energy part and the sensing operation configuration. As mentioned above, the sensing operation parts may be performed simultaneously or sequentially.

Some further examples of sensing operation parts are an air pressure sensing operation part, a light sensing operation part, a sound sensing operation part, and an object sensing operation part just to mention some more examples. To perform the light sensing operation part, the wireless device 102 may comprise a photo diode or a light detector. To perform the sound sensing operation part, the wireless device 102 may comprise a microphone and to perform the object sensing operation part, the wireless device 102 may comprise a RADAR or a LIDAR based equipment.

Action 208

In some embodiments, the wireless device 102 stores information, e.g. sensor data, relating to a performed sensing operation in a data storage unit 306b. Thereby, the information may be retrieved at e.g. a later point in time as will be described in Action 208.

Action 209

In some embodiments, the wireless device 102 retrieves information from the data storage unit 306b.

The retrieved information may for example be used as control information, such as historical data, when determining the allocation of the amount of available energy as described in Action 205 above.

Further, the retrieved information may be communicated to a network node, e.g. the network node 104, in a communicating operation performed at a later point in time.

Action 210

As previously mentioned in Action 207 above, the wireless device 106 performs based on the determined allocation, one or more operations. In Action 210, the wireless device 106 may perform the communicating operation using the second energy part and the communicating operation configuration.

As described in Action 207 above, the communicating operation may be performed as an alternative to the sensing operation or in addition to the sensing operation.

In some embodiments, when the wireless device 102 performs the communicating operation in addition to a prioritised sensing operation, the wireless device 102 may perform the communicating operation only when the second energy part has been determined to be sufficient as mentioned above in Action 206. Correspondingly, when the communicating operation is prioritised higher than the sensing operation, the wireless device 102 may perform the sensing action as described in Action 207 above only if the first energy part is sufficient for performing the sensing operation in addition to the communicating operation.

It should be understood that Actions 207 and 210 may be performed in parallel or in sequence.

In some embodiments, when the wireless device 102 has retrieved information as described in Action 209 above, the wireless device 102 may perform the communicating operation by further communicating the retrieved information to the network node 104 operating in the wireless communications network 100. In other words, the wireless device 102 may transmit retrieved information to the network node 104. The retrieved information may relate to one or more previously performed sensing operations.

In some embodiments, when the wireless device 102 has performed the sensing operation using the first energy part and the sensing operation configuration as described in Action 207 above, and when the second energy part is sufficient for performing the communicating operation using the second energy part and the communicating operation configuration, the wireless device 102 performs the communicating operation using the second energy part and the communicating operation configuration. Thus in some embodiments, the wireless device 102 first performs the sensing operation and thereafter checks whether the second energy part is sufficient for performing the communicating operation using the communicating operation configuration, and if the second energy part is sufficient, the wireless device 102 performs the communicating operation using the communicating operation configuration. If the second energy part is not sufficient, i.e. it is not large enough to perform the communicating operation, the wireless device 102 will defer from performing the communicating operation until a future point of time when enough energy is available. In the meantime information relating to the performed sensing operation may be stored in the data storage 306b as mentioned in Action 209 above.

Figure 3:
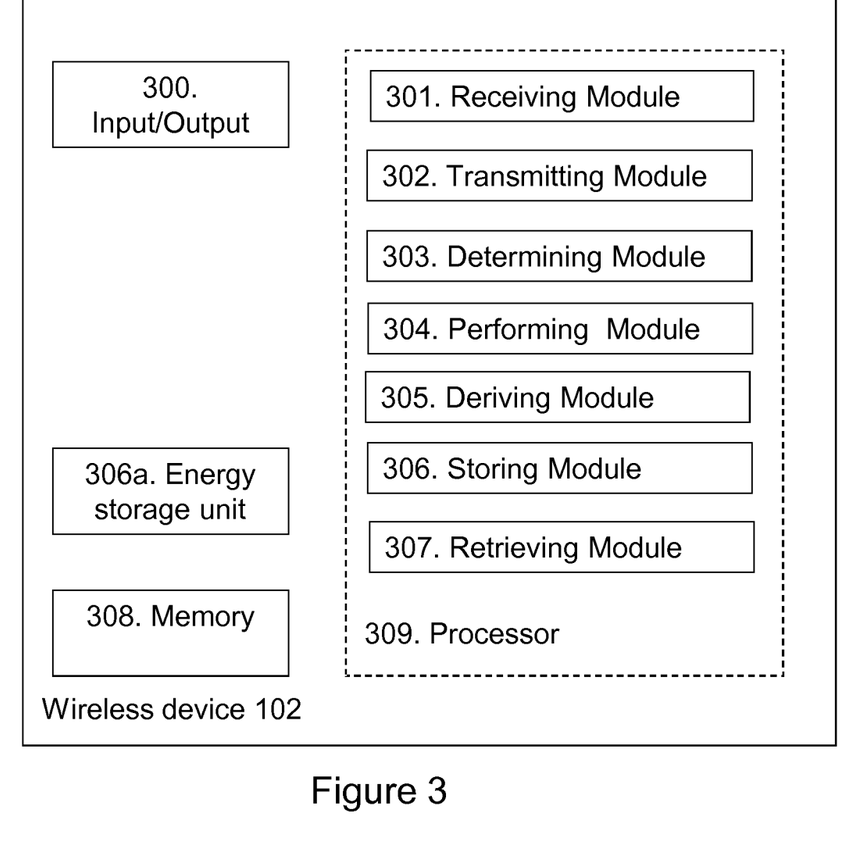
FIG. 3 is a block diagram schematically illustrating embodiments of a wireless device.

To perform the method for performing one or more operations based on available energy, the wireless device 102 may be configured according to an arrangement depicted in FIG. 3. As previously mentioned, the wireless device 102 is configured to operate in the wireless communications network 100.

The wireless device 102 comprises an input and output interface 300 configured to communicate in the wireless communications network 100, e.g. with one or more network nodes, e.g. the network node 104. The input and output interface 300 may comprise a wireless receiver (not shown) and a wireless transmitter (not shown).

The wireless device 102 is configured to receive, e.g. by means of a receiving module 301 configured to receive, a first transmission from one or more network nodes operating in the wireless communications network 100, e.g. from the network node 104. The receiving module 301 may be implemented by or arranged in communication with a processor 309 of the wireless device 102. The processor 309 will be described in more detail below. The first transmission may comprise or relate to control information, a sensing operation configuration and/or a communicating operation configuration.

The wireless device 102 is configured to transmit, e.g. by means of a transmitting module 302 configured to transmit, a second transmission to one or more network nodes operating in the wireless communications network 100, e.g. to the network node 104. The transmitting module 302 may be implemented by or arranged in communication with the processor 309 of the wireless device 102. The second transmission may comprise or relate to information relating to a performed operation, e.g. to a sensing operation and/or a communicating operation.

The wireless device 102 is configured to determine, e.g. by means of a determining module 303 configured to determine, an allocation of energy available for operation. The determining module 303 may be implemented by or arranged in communication with the processor 309 of the wireless device 102.

The wireless device 102 is configured to determine an allocation of an amount of available energy between at least a first energy part and a second energy part based on the amount of energy available for operation and based on control information. The first energy part of the amount of available energy is to be used in a sensing operation using a sensing operation configuration and the second energy part of the amount of available energy is to be used in a communicating operation using a communicating operation configuration.

In some embodiments, the control information comprises information relating to one or more out of: a pre-configuration of the wireless device 102, historic data of one or more previously performed sensing and/or communicating operations, a first predefined energy consumption per sensing operation for performing the sensing operation using one or more sensors, a second energy consumption per communicating operation for performing the communicating operation, a priority relation between the sensing operation and the communicating operation.

The wireless device 102 may determine the amount of energy available for operation based on an amount of energy stored in an energy storage unit 306a and possibly further based on a predicted amount of energy available for operation at a future point of time.

In some embodiments, the wireless device 102 is configured to determine the sensing operation configuration available for the sensing operation and the communicating operation configuration available for the communicating operation, based on the amount of available energy and based on the control information.

The sensing configuration may comprise one or more of: an amount of time for the sensing operation; information relating to one or more sensors to be enabled when performing the sensing operation, and information relating to the accuracy of resolution and sampling frequency of the sensing operation.

The communicating configuration may comprise one or more of: information relating to a prioritisation of data to be communicated, a time duration for the communicating operation, a resolution of data to be communicated, an available point of time for performing a signal strength measurement, and a bandwidth for performing the signal strength measurement.

In some embodiments, the wireless device 102 is configured to determine whether or not the first energy part is sufficient for performing the sensing operation using the first energy part and the sensing operation configuration.

Alternatively or additionally, in some embodiments, the wireless device 102 is configured to determine whether or not the second energy part is sufficient for performing the communicating operation using the second energy part and the communicating operation configuration.

The wireless device 102 is configured to perform, e.g. by means of a performing module 304 configured to perform, one or more operations. The performing module 304 may be implemented by or arranged in communication with the processor 309 of the wireless device 102.

The wireless device 102 is configured to perform, based on the determined allocation, one or more operations out of: the sensing operation using the first energy part and the sensing operation configuration, and the communicating operation using the second energy part and the communicating operation configuration.

The wireless device 102 may be configured to perform the sensing operation when the first energy part is sufficient for performing the sensing operation using the first energy part and the sensing configuration.

In correspondence, the wireless device 102 may be configured to perform the communicating operation when the second energy part is sufficient for performing the communicating operation using the second energy part and the communicating configuration.

Further, the wireless device 102 may be configured to perform the sensing operation and the communicating operation in parallel or in sequence.

In some embodiments, when the wireless device 102 has retrieved information, the wireless device 102 is configured to perform the communicating operation by communicating the retrieved information to the network node 104 operating in the wireless communications network 100.

Sometimes the sensing operation comprises a plurality of sensor operation parts, and then the wireless device 102 may be configured to perform the sensing operation using the first energy part and the sensing operation configuration by being configured to perform each sensor operation part out of the plurality of sensor operation parts using a fraction of the first energy part and the sensing operation configuration.

In some embodiments, the wireless device 102 is further configured to perform the one or more operations out of: the sensing operation using the first energy part and the sensing operation configuration, and the communicating operation using the second energy part and the communicating operation configuration by being configured to perform the sensing operation using the first energy part and the sensing operation configuration; and when the second energy part is sufficient for performing the communicating operation using the second energy part and the communicating operation configuration, perform the communicating operation using the second energy part and the communicating operation configuration.

Alternatively or additionally, in some embodiments, the wireless device 102 is further configured to perform the one or more operations out of: the sensing operation using the first energy part and the sensing operation configuration, and the communicating operation using the second energy part and the communicating operation configuration by being configured to perform the communicating operation using the second energy part and the communicating operation configuration; and when the first energy part is sufficient for performing the sensing operation using the first energy part and the sensing operation configuration, perform the sensing operation using the first energy part and the sensing operation configuration.

The wireless device 102 may be configured to derive, e.g. by means of a deriving module 305 configured to derive, energy from an external source, such as an external energy source. The deriving module 305 may be implemented by or arranged in communication with the processor 309 of the wireless device 102.

For example, the energy may be one or more of: solar energy, thermal energy, wind energy, energy from salinity gradients, kinetic energy; and energy from an external battery just to mention some examples.

The wireless device 102 may be configured to store, e.g. by means of a storing module 306 configured to store, energy and/or information. The storing module 306 may be implemented by or arranged in communication with the processor 309 of the wireless device 102.

In some embodiments, the wireless device 102 is configured to store derived energy in an energy storage unit 306a. As illustrated in FIG. 3, the energy storage unit 306a may be comprised in the wireless device 102. However, the energy storage unit 306a may also be an external energy storage unit connected to the wireless device 102.

In some embodiments, the wireless device 102 is configured to store information relating to a performed sensing operation in a memory 308. The memory 308 will be described in more detail below.

The wireless device 102 may be configured to retrieve, e.g. by means of a retrieving module 307 configured to retrieve, information, e.g. to retrieve stored information from the data storage unit 306b. The retrieving module 307 may be implemented by or arranged in communication with the processor 309 of the wireless device 102.

The wireless device 102 may also comprise means for storing data. In some embodiments, the wireless device 102 comprises a memory 308 configured to store the data. The data may be processed or non-processed data and/or information relating thereto. The memory 308 may comprise one or more memory units. Further, the memory 308 may be a computer data storage or a semiconductor memory such as a computer memory, a read-only memory, a volatile memory or a non-volatile memory. The memory is arranged to be used to store obtained information, data, configurations, scheduling algorithms, and applications etc. to perform the methods herein when being executed in the wireless device 102.

Embodiments herein for performing one or more operations based on available energy may be implemented through one or more processors, such as the processor 309 in the arrangement depicted in FIG. 3, together with computer program code for performing the functions and/or method actions of embodiments herein. The program code mentioned above may also be provided as a computer program product, for instance in the form of a data carrier carrying computer program code for performing the embodiments herein when being loaded into the wireless device 102. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the wireless device 102.

Those skilled in the art will also appreciate that the input/output interface 300, the receiving module 301, the transmitting module 302, the determining module 303, the performing module 304, the deriving module 305, the storing module 306, and the retrieving module 307 above may refer to a combination of analog and digital circuits, and/or one or more processors configured with software and/or firmware, e.g. stored in the memory 308, that when executed by the one or more processors such as the processors in the wireless device 102 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Some Exemplary Embodiments

In some embodiments, the wireless device 102 may be a camera-based motion detector. The sensing operation performed may comprise two sensing operation parts wherein a first sensing operation part may be a motion detection operation and a second sensing operation part may be an image capturing operation. For example, if the motion detection operation has a higher priority than the image capturing operation and if the available amount of energy is not sufficient for performing both the motion detection operation and the image capturing operation in combination with performing the communicating operation, the wireless device 102 may determine to perform only the motion detection operation and the communicating operation. Thus, with little available energy, only a motion detection signal is transmitted, whereas with more available energy also a picture is recorded and transmitted.

In some other embodiments, the wireless device 102 may comprise a plurality of sensors with different prioritization. For example, a temperature sensor may be prioritized higher than a humidity sensor. Hence, at some instants only temperature data is transmitted whereas at other instants also humidity information is transmitted by the wireless device 102.

In some embodiments, the wireless device 102 may be configured to enable both the sensing operation and the communicating operation such as reporting real-time measurements. A configurable parameter may be the resolution of the gathered data. On example of such a wireless device 102 may be a surveillance camera, e.g. the camera-based motion detector mentioned above, in a mode where it is obligated to provide periodic real-time images. At lower resolution, both the sensing operation and the communicating operation, e.g. the data transmission, consume less energy. In such embodiments, the wireless device 102 may determine the highest resolution for which the sum of the energy required for performing the sensing operation and the communicating operation is lower than the available energy.

In some embodiments, the wireless device 102 may determine that only a sensing operation such as a sensor measurement, should be performed with the available amount of energy. Sensor information may then be stored for later transmission once more energy is available, e.g. when more energy has been derived by the deriving module 305. The deriving module 305 may be an energy harvesting unit. For example, this may be the case for statistics collection sensors where periodic measurements are essential while real-time reporting of data is not important. If insufficient energy is available for both the sensing operation and the communicating operation, e.g. for reporting, only the sensing operation is performed.

In some other embodiments the wireless device 102 may determine that all available energy should be used for the communicating operation in order to transmit stored sensor data and/or to receive data/commands/measurements.

In some embodiments, the total available energy may be consumed by the next scheduled sensing operation and/or communicating operation. In other embodiments, the total available energy must be managed so that it suffices for multiple operations. If the number of such operations before the next energy boost is known, the energy per operation may be derived by appropriate division. If it is unknown, the presumed number of remaining operations may be kept constant after each performed operation, resulting in an exponentially decaying energy allocation per operation.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a wireless device for performing one or more operations based on available energy, wherein the wireless device is configured to operate in a wireless communications network, and wherein the method comprises:
    based on an amount of energy available for operation and based on control information and prior to performing a sensing operation using a sensing operation configuration and prior to performing a communicating operation using a communicating operation configuration, determining an allocation of the amount of available energy between at least a first energy part and a second energy part, wherein the first energy part of the amount of available energy is to be used in the sensing operation using the sensing operation configuration and the second energy part of the amount of available energy is to be used in the communicating operation using the communicating operation configuration; and
    performing based on the determined allocation, one or more operations out of: the sensing operation using the first energy part and the sensing operation configuration, and the communicating operation using the second energy part and the communicating operation configuration,
    wherein the control information comprises information relating to a priority relation between the sensing operation and the communicating operation, and
    wherein the sensing configuration comprises one or more of: an amount of time for the sensing operation; information relating to one or more sensors to be enabled when performing the sensing operation, and information relating to the accuracy of resolution and sampling frequency of the sensing operation.

2. The method of claim 1, wherein the control information comprises information relating to one or more out of: a pre-configuration of the wireless device, historic data of one or more previously performed sensing and/or communicating operations, a first predefined energy consumption per sensing operation for performing the sensing operation using one or more sensors, a second energy consumption per communicating operation for performing the communicating operation.

3. The method of claim 1, further comprising:
determining the amount of energy available for operation based on a predicted amount of energy available for operation at a future point of time.

4. The method of claim 1, further comprising:
based on the amount of available energy for operation and based on the control information, determining the sensing operation configuration available for the sensing operation; and the communicating operation configuration available for the communicating operation.

5. The method of claim 1, wherein the communicating configuration comprises one or more of: information relating to a prioritisation of data to be communicated, a time duration for the communicating operation, a resolution of data to be communicated, an available point of time for performing a signal strength measurement, and a bandwidth for performing the signal strength measurement.

6. The method of claim 1, further comprising:
deriving energy from an external source; and
storing the derived energy in an energy storage unit, wherein the energy is one or more of: solar energy, thermal energy, wind energy, energy from salinity gradients, kinetic energy; and energy from an external battery.

7. The method of claim 1, further comprising:
storing information relating to a performed sensing operation in a data storage unit;
retrieving information from the data storage unit, and wherein the performing of the communicating operation comprises communicating the retrieved information to a network node operating in the wireless communications network.

8. The method of claim 1, wherein the sensing operation comprises a plurality of sensor operation parts, and wherein the performing of the sensing operation using the first energy part and the sensing operation configuration comprises:
performing each sensor operation part out of the plurality of sensor operation parts using a fraction of the first energy part and the sensing operation configuration.

9. The method of claim 1, wherein the performing of the one or more operations out of: the sensing operation using the first energy part and the sensing operation configuration, and the communicating operation using the second energy part and the communicating operation configuration comprises:
performing the sensing operation using the first energy part and the sensing operation configuration; and
when the second energy part is sufficient for performing the communicating operation using the second energy part and the communicating operation configuration, performing the communicating operation using the second energy part and the communicating operation configuration.

10. The method of claim 9, further comprising:
determining whether or not the second energy part is sufficient for performing the communicating operation using the second energy part and the communicating operation configuration.

11. The method of claim 1, wherein the performing of the one or more operations out of: the sensing operation using the first energy part and the sensing operation configuration, and the communicating operation using the second energy part and the communicating operation configuration comprises:
performing the communicating operation using the second energy part and the communicating operation configuration; and when the first energy part is sufficient for performing the sensing operation using the first energy part and the sensing operation configuration, performing the sensing operation using the first energy part and the sensing operation configuration.

12. The method of claim 11, further comprising:
determining whether or not the first energy part is sufficient for performing the sensing operation using the first energy part and the sensing operation configuration.

13. A wireless device for performing one or more operations based on available energy, wherein the wireless device is configured to operate in a wireless communications network, and wherein the wireless device is configured to:
based on an amount of energy available for operation and based on control information and prior to performing a sensing operation using a sensing operation configuration and prior to performing a communicating operation using a communicating operation configuration, determine an allocation of the amount of available energy between at least a first energy part and a second energy part, wherein the first energy part of the amount of available energy is to be used in the sensing operation using the sensing operation configuration and the second energy part of the amount of available energy is to be used in the communicating operation using the communicating operation configuration; and
perform based on the determined allocation one or more operations out of: the sensing operation using the first energy part and the sensing operation configuration, and the communicating operation using the second energy part and the communicating operation configuration,
wherein the control information comprises information relating to a priority relation between the sensing operation and the communicating operation, and
wherein the sensing configuration comprises one or more of: an amount of time for the sensing operation; information relating to one or more sensors to be enabled when performing the sensing operation, and information relating to the accuracy of resolution and sampling frequency of the sensing operation.

14. The wireless device of claim 13, wherein the control information comprises information relating to one or more out of: a pre-configuration of the wireless device, historic data of one or more previously performed sensing and/or communicating operations, a first predefined energy consumption per sensing operation for performing the sensing operation using one or more sensors, a second energy consumption per communicating operation for performing the communicating operation.

15. The wireless device of claim 13, further being configured to:
determine the amount of energy available for operation based on a predicted amount of energy available for operation at a future point of time.

16. The wireless device of claim 13, further being configured to:
based on the amount of available energy and based on the control information, determine the sensing operation configuration available for the sensing operation; and the communicating operation configuration available for the communicating operation.

17. The wireless device of claim 13, wherein the communicating configuration comprises one or more of: information relating to a prioritisation of data to be communicated, a time duration for the communicating operation, a resolution of data to be communicated, an available point of time for performing a signal strength measurement, and a bandwidth for performing the signal strength measurement.

18. The wireless device of claim 13, further being configured to:
derive energy from an external source; and
store the derived energy in an energy storage unit, wherein the energy is one or more of: solar energy, thermal energy, wind energy, energy from salinity gradients, kinetic energy; and energy from an external battery.

19. The wireless device of claim 13, further being configured to:
store information relating to a performed sensing operation in a data storage unit;
retrieve information from the data storage unit, and wherein the wireless device is configured to perform the communicating operation by being configured to communicate the retrieved information to a network node operating in the wireless communications network.

20. The wireless device of claim 13, wherein the sensing operation comprises a plurality of sensor operation parts, and wherein the wireless device is configured to perform the sensing operation using the first energy part and the sensing operation configuration by being configured to perform each sensor operation part out of the plurality of sensor operation parts using a fraction of the first energy part and the sensing operation configuration.

21. The wireless device of claim 13, further being configured to perform the one or more operations out of: the sensing operation using the first energy part and the sensing operation configuration, and the communicating operation using the second energy part and the communicating operation configuration by being configured to:
perform the sensing operation using the first energy part and the sensing operation configuration; and
when the second energy part is sufficient for performing the communicating operation using the second energy part and the communicating operation configuration, perform the communicating operation using the second energy part and the communicating operation configuration.

22. The wireless device of claim 21, further being configured to:
determine whether or not the second energy part is sufficient for performing the communicating operation using the second energy part and the communicating operation configuration.

23. The wireless device of claim 13, further being configured to perform the one or more operations out of: the sensing operation using the first energy part and the sensing operation configuration, and the communicating operation using the second energy part and the communicating operation configuration by being configured to:
perform the communicating operation using the second energy part and the communicating operation configuration; and
when the first energy part is sufficient for performing the sensing operation using the first energy part and the sensing operation configuration, perform the sensing operation using the first energy part and the sensing operation configuration.

24. The wireless device of claim 23, further being configured to:
determine whether or not the first energy part is sufficient for performing the sensing operation using the first energy part and the sensing operation configuration.

25. A nontransitory computer-readable medium comprising a computer program, comprising instructions which, when executed on at least one processor of a wireless device, causes the at least one processor to carry out a method of the wireless device for performing one or more operations based on available energy, wherein the wireless device is configured to operate in a wireless communications network, and wherein the method comprises:
based on an amount of energy available for operation and based on control information and prior to performing a sensing operation using a sensing operation configuration and prior to performing a communicating operation using a communicating operation configuration, determining an allocation of the amount of available energy between at least a first energy part and a second energy part, wherein the first energy part of the amount of available energy is to be used in the sensing operation using the sensing operation configuration and the second energy part of the amount of available energy is to be used in the communicating operation using the communicating operation configuration; and
performing based on the determined allocation, one or more operations out of: the sensing operation using the first energy part and the sensing operation configuration, and the communicating operation using the second energy part and the communicating operation configuration,
wherein the control information comprises information relating to a priority relation between the sensing operation and the communicating operation, and
wherein the sensing configuration comprises one or more of: an amount of time for the sensing operation; information relating to one or more sensors to be enabled when performing the sensing operation, and information relating to the accuracy of resolution and sampling frequency of the sensing operation.

* * * * *